United States Patent
Lien et al.

(10) Patent No.: US 10,853,167 B2
(45) Date of Patent: Dec. 1, 2020

(54) MEMORY APPARATUS HAVING HIERARCHICAL ERROR CORRECTION CODE LAYER

(71) Applicant: Winbond Electronics Corp., Taichung (TW)

(72) Inventors: Chuen-Der Lien, San Jose, CA (US); Ming-Huei Shieh, San Jose, CA (US); Chi-Shun Lin, San Jose, CA (US); Seow Fong Lim, San Jose, CA (US); Ngatik Cheung, San Jose, CA (US)

(73) Assignee: Winbond Electronics Corp., Taichung (TW)

( * ) Notice: Subject to any disclaimer, the term of this patent is extended or adjusted under 35 U.S.C. 154(b) by 65 days.

(21) Appl. No.: 16/260,058

(22) Filed: Jan. 28, 2019

(65) Prior Publication Data
US 2020/0241957 A1    Jul. 30, 2020

(51) Int. Cl.
*G06F 11/10*    (2006.01)

(52) U.S. Cl.
CPC ...... *G06F 11/1032* (2013.01); *G06F 11/1044* (2013.01)

(58) Field of Classification Search
CPC .................................................. G06F 11/1032
USPC ........................................................ 714/766
See application file for complete search history.

(56) References Cited

U.S. PATENT DOCUMENTS

| | | | |
|---|---|---|---|
| 8,464,137 B2 | 6/2013 | Franceschini et al. | |
| 8,578,095 B2 * | 11/2013 | Eilert .................. | G06F 13/1668 711/117 |
| 2006/0061795 A1 * | 3/2006 | Walmsley ............... | G06F 21/73 358/1.14 |
| 2006/0164462 A1 * | 7/2006 | Silverbrook ............. | B41J 2/155 347/40 |
| 2006/0181558 A1 * | 8/2006 | Walmsley ............ | B41J 2/04543 347/12 |
| 2008/0256417 A1 * | 10/2008 | Andersson ........ | H03M 13/2732 714/762 |
| 2010/0250849 A1 * | 9/2010 | Eilert ..................... | G06F 13/385 711/117 |
| 2018/0013451 A1 | 1/2018 | Kaynak et al. | |
| 2018/0129560 A1 | 5/2018 | Byeon | |
| 2019/0294493 A1 * | 9/2019 | Bradshaw ............. | G06F 3/0619 |

FOREIGN PATENT DOCUMENTS

| | | |
|---|---|---|
| CN | 104809031 | 1/2018 |
| TW | I527049 | 3/2016 |
| TW | 201805952 | 2/2018 |

OTHER PUBLICATIONS

"Office Action of Taiwan Counterpart Application", dated Feb. 15, 2020, p. 1-p. 6.

* cited by examiner

*Primary Examiner* — Fritz Alphonse
(74) *Attorney, Agent, or Firm* — JCIPRNET

(57) ABSTRACT

The invention provides a memory apparatus including a memory cell array and a hierarchical error correction code (ECC) layer. The hierarchical ECC layer, includes N layers of ECC coder-decoder, wherein the hierarchical ECC layer enables one of the N layers to operate an encoding or decoding operation on processed data, and the hierarchical ECC layer enables another one of the N layers merely when the error bit number of the processed data reaches to N−1 pre-set error correction number(s), and N is a positive integer larger than 1.

13 Claims, 4 Drawing Sheets

MEMORY APPARATUS HAVING HIERARCHICAL ERROR CORRECTION CODE LAYER

BACKGROUND OF THE INVENTION

Field of the Invention

The invention relates to a memory apparatus, and particularly relates to a memory apparatus having a hierarchical error correction code (ECC) layer.

Description of Related Art

In a usage of memory apparatus, customer requests a multiple non-volatile memories (NVM) with different type memories which are integrated in a single chip, and the NVM respectively have different cycling endurances. For integrating the memories, a suitable ECC scheme is necessary for enhancing data reliability.

SUMMARY OF THE INVENTION

The invention is directed to a memory apparatus having a hierarchical error correction code (ECC) layer, and the memory apparatus integrates a plurality of memory cell arrays with different types.

The invention provides the memory apparatus including a memory cell array and a hierarchical error correction code (ECC) layer. The hierarchical ECC layer, includes N layers of ECC coder-decoder, wherein the hierarchical ECC layer enables one of the N layers to operate an encoding or decoding operation on processed data, and the hierarchical ECC layer enables another one of the N layers merely when the error bit number of the processed data reaches to N-1 pre-set error correction number(s), and N is a positive integer larger than 1.

The invention also provides the memory apparatus including a plurality of memory cell arrays and the hierarchical error correction code (ECC) layer mentioned above. The memory cell arrays include a first memory cell array and a second memory cell array wherein the second memory cell array shares one of the N-layers.

According to the above descriptions, the present disclosure provides the hierarchical ECC layer, and the hierarchical ECC layer enables the first layer ECC coder-decoder merely when an error bit number of the message reaches to a pre-set error correction number of the second ECC coder-decoder. That is, more ECC used by higher quality bits and/or parity bits than other bits. The cycling rate of the memory apparatus can be improved accordingly.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
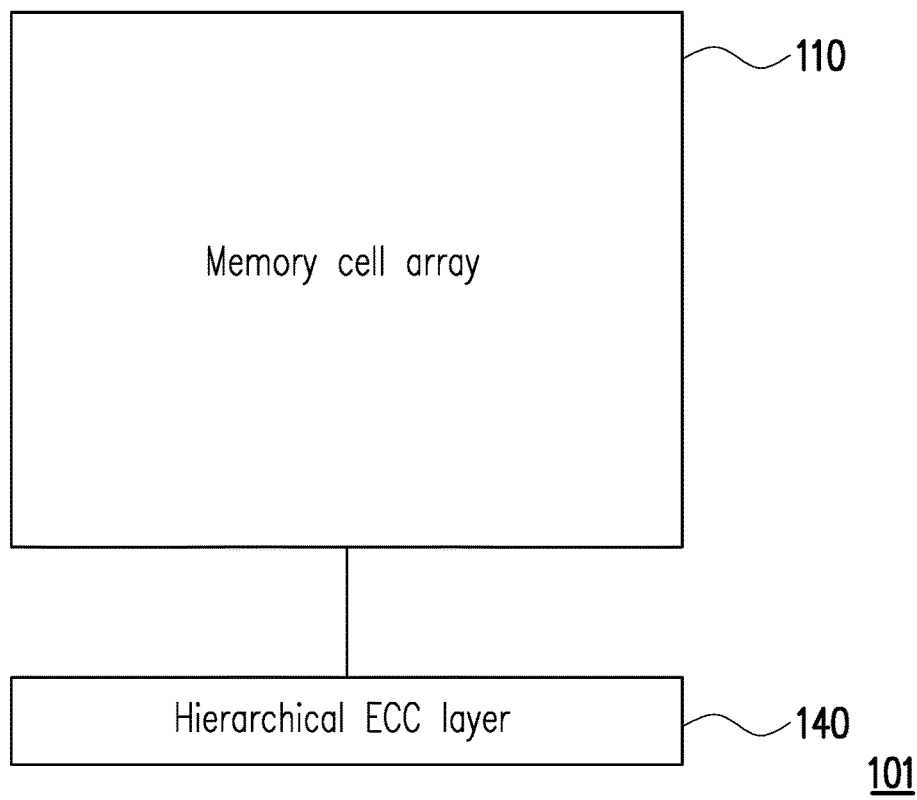
FIG. 1A illustrates a memory apparatus according to an embodiment of present disclosure.

Referring to FIG. 1A, which illustrates a memory apparatus according to an embodiment of present disclosure. The memory apparatus 102 includes a memory cell array 110 and a hierarchical error correction code (ECC) layer 140. The memory cell array 110 and the hierarchical error correction code (ECC) layer 140 may be integrated to a signal chip. The memory cell array 110 is non-volatile memory cell array.

In this embodiment, the hierarchical ECC layer 140 is coupled to the memory cell array 110. The hierarchical ECC layer 140 may include N layers of ECC coder-decoder, and each of the layers includes an ECC coder-decoder, where N is a positive integer larger than 2. For example, the hierarchical ECC layer 140 may include 2 layers of ECC, and the two layers of ECC respectively includes a first layer ECC coder-decoder and a second layer ECC coder-decoder. It should be noted here, the hierarchical ECC layer 140 enables the second ECC coder-decoder to operate an encoding or decoding operation on processed data, the hierarchical ECC layer 140 may enable the first layer ECC coder-decoder merely when an error bit number of the processed data reaches to N-1 pre-set error correction number(s). In some embodiment, the N-1 pre-set error correction number(s) may a maximum error correction number of the second ECC coder-decoder.

In some embodiment, the processed data may be a word in the memory cell array 110, and the hierarchical ECC layer 140 enables the first layer of the word merely when the error bit number of the word reaches to N-1 pre-set error correction number(s).

It should be noted here, the hierarchical ECC layer 140 may include 3 or more layers of ECC coder-decoder. Take the hierarchical ECC layer 140 includes 3 layers of ECC coder-decoder for an example. The hierarchical ECC layer 140 may enable a third ECC layer coder-decoder firstly, enable a second layer ECC coder-decoder secondly, and enable a third layer ECC coder-decoder finally according to the error bit number of the processed data, where error correction abilities of the first, second and third layers ECC coder-decoder are different.

In present embodiment, the hierarchical ECC layer 140 enables both of the first ECC coder-decoder and the second ECC coder-decoder to operate ECC operation on the processed data when the processed data is written with a weaker write condition. On the other hand, the hierarchical ECC layer 140 may merely enable the second ECC coder-decoder to operate ECC operation on the processed data when the processed data is written with a stronger write condition. Besides, when the processed data is written into memory cells in the weaker write condition, the processed data is written into the memory cells with a first write voltage, and when the processed data is written into the memory cells in the stronger write condition, the processed data is written into the memory cells with a second write voltage higher than the first voltage.

In some embodiments, the processed data may include a plurality of message bits and a plurality of parity bits. When both of the first layer ECC coder-decoder and the second layer ECC coder-decoder are enabled, a first ECC operation is operated on the plurality of parity bits, and a second ECC operation is operated on the plurality of message bits by the second layer ECC coder-decoder. Also, after the first ECC operation has been operated on the plurality of message bits, the second ECC operation may be also operated on the plurality of parity bits. In here, an error correction strength of the first ECC operation is stronger than an error correction strength of the second ECC operation.

Furthermore, the message bits and the parity bits may be written into two different type memory cell arrays. That is, the message bits may be written into one of the first to third memory cell arrays 110-130, and the parity bits may to written into another one of the first to third memory cell arrays 110-130. For example, the parity bits may be written into the third memory cell array 130, and the message bits may be written into the second memory cell array 120.

Figure 1B:
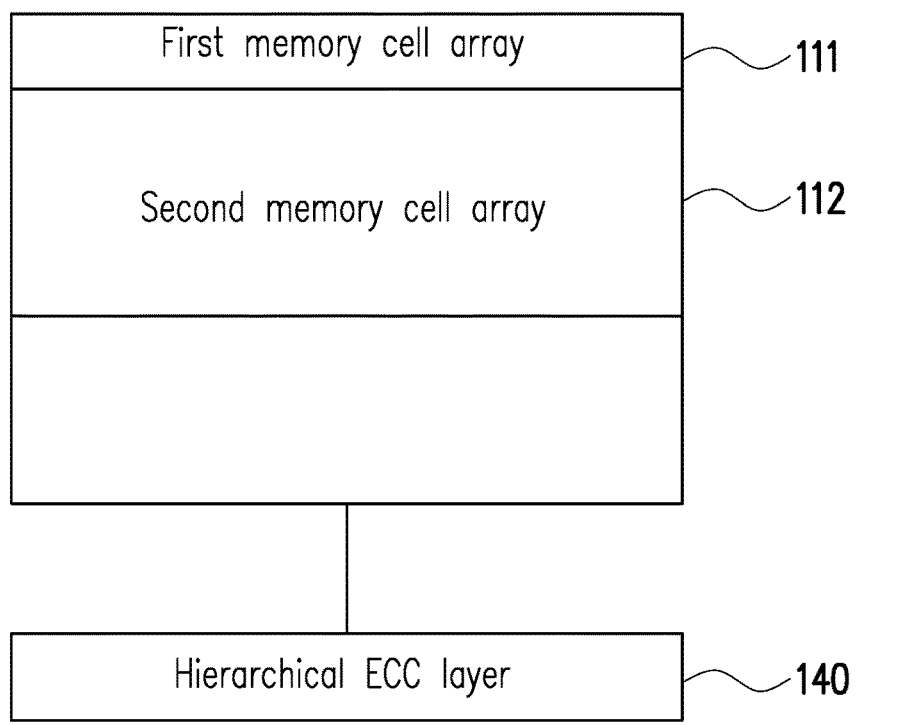
FIG. 1B illustrates a memory apparatus according to another embodiment of present disclosure.

Referring to FIG. 1B, which illustrates a memory apparatus according to another embodiment of present disclosure. The memory apparatus 102 includes a first memory cell array 111, a second memory cell array 112 and a hierarchical error correction code (ECC) layer 140. The first memory cell array 111 and the second memory cell array 112 are integrated to a signal chip. The first memory cell array 111 and the second memory cell array 112 are all non-volatile memory cell arrays, and respectively have a plurality of different cycling rates. For example, each of the first memory cell array 110 and the second memory cell array 120 may be an one-time programming (OTP) memory cell array, a flash memory cell array or an electrically-erasable programmable read-only memory (EEPROM) memory cell array. An OTP memory cell may have one writing cycle, a flash memory cell may have 100 k writing cycles, and an EEPROM memory cell may have 1 kk writing cycles.

In this embodiment, the hierarchical ECC layer 140 is coupled to the first memory cell array 111 and the second memory cell array 112. Similar to the embodiment of FIG. 1A, the hierarchical ECC layer 140 may include N layers ECC coder-decoder. It should be noted here, the first memory cell array 120 has the N layers ECC coder-decoder in the hierarchical ECC layer 140, and the second memory cell array 112 shares one of the N layers ECC coder-decoder in the hierarchical ECC layer 140.

Figure 2:
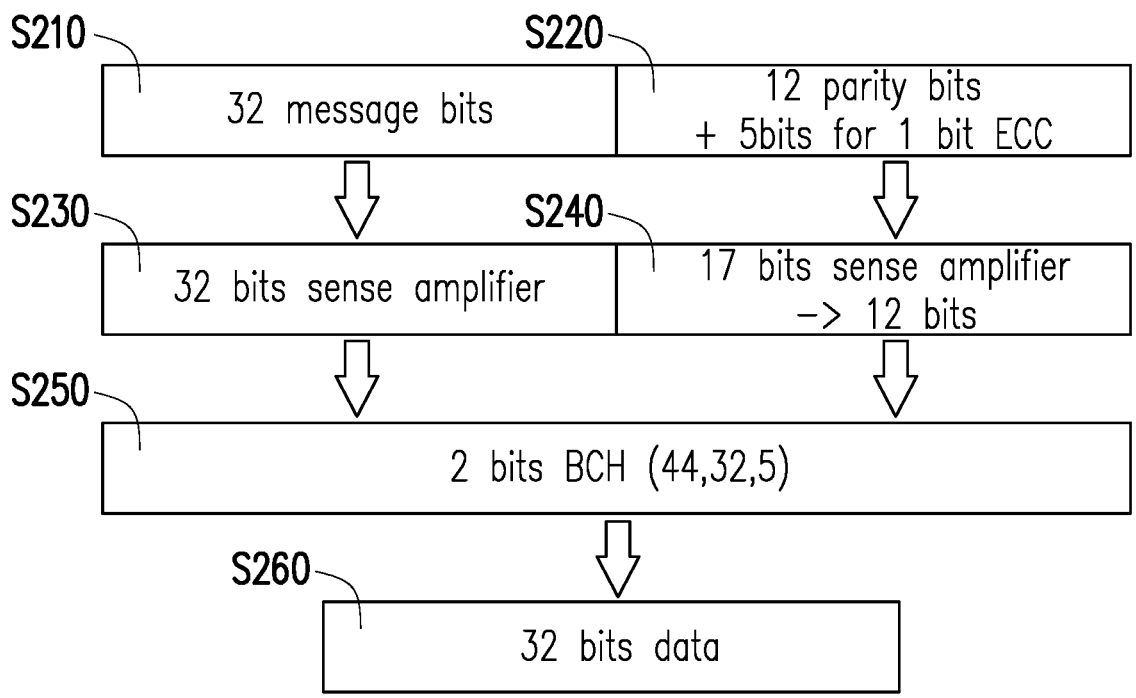
FIG. 2 illustrates a flow chart of an ECC operation according to an embodiment of present disclosure.

Detail operation sequence of present disclosure can be seen in FIG. 2. Referring to FIG. 2, which illustrates a flow chart of an ECC operation according to an embodiment of present disclosure. In step S210, message bits with 32 bits is received and in step S220, parity bits with 12 bits which are generated according to the message bits are received, too. In the step S220, a first ECC operation by a first layer ECC coder-decoder may be enabled, and the first ECC operation can be operated on the parity bits to generate an ECC data with 5 bits. The first ECC operation may be an one bit ECC operation.

In step S230, the message bits are transported to a sense amplifier having 32 sense amplify circuits, and the 32 message bits are respectively received and sense by the 32 sense amplify circuits. The 32 sense amplify circuits may generate first sensed data with 32 bits according to the message bits. On the other way, in step S240, the parity bits and the 5 bits ECC data are transported to a sense amplifier having 17 sense amplify circuits. The 17 sense amplify circuits may sense the parity bits and the 5 bits ECC data to generate second sensed data with 12 bits.

Both of the first sensed data and the second sensed data are processed in step S250, and a second ECC operation by a second layer ECC coder-decoder is enabled in the step S250. In here, a 2 bits ECC operation, a BCH coding operation, is operated on the first sensed data and the second sensed data. The BCH coding operation can be performed by a formula BCH (44, 32, 5) for correcting 2 error bits, where 44 is total bit number of the first sensed data and the second sensed data, 32 is bit number of the message bits, and 5 is a minimum distance. Finally, in step S250, an output data with 32 bits can be obtained.

Please be noted here, in present embodiment, the first ECC operation in the step S220 may not be enabled. In fact, in present embodiment, the first ECC operation in the step S220 is enabled merely when an error bit number of the processed data reaches to a pre-set error correction number, where the pre-set error correction number may be a maximum error correction number of the second ECC coder-decoder.

Figure 3:
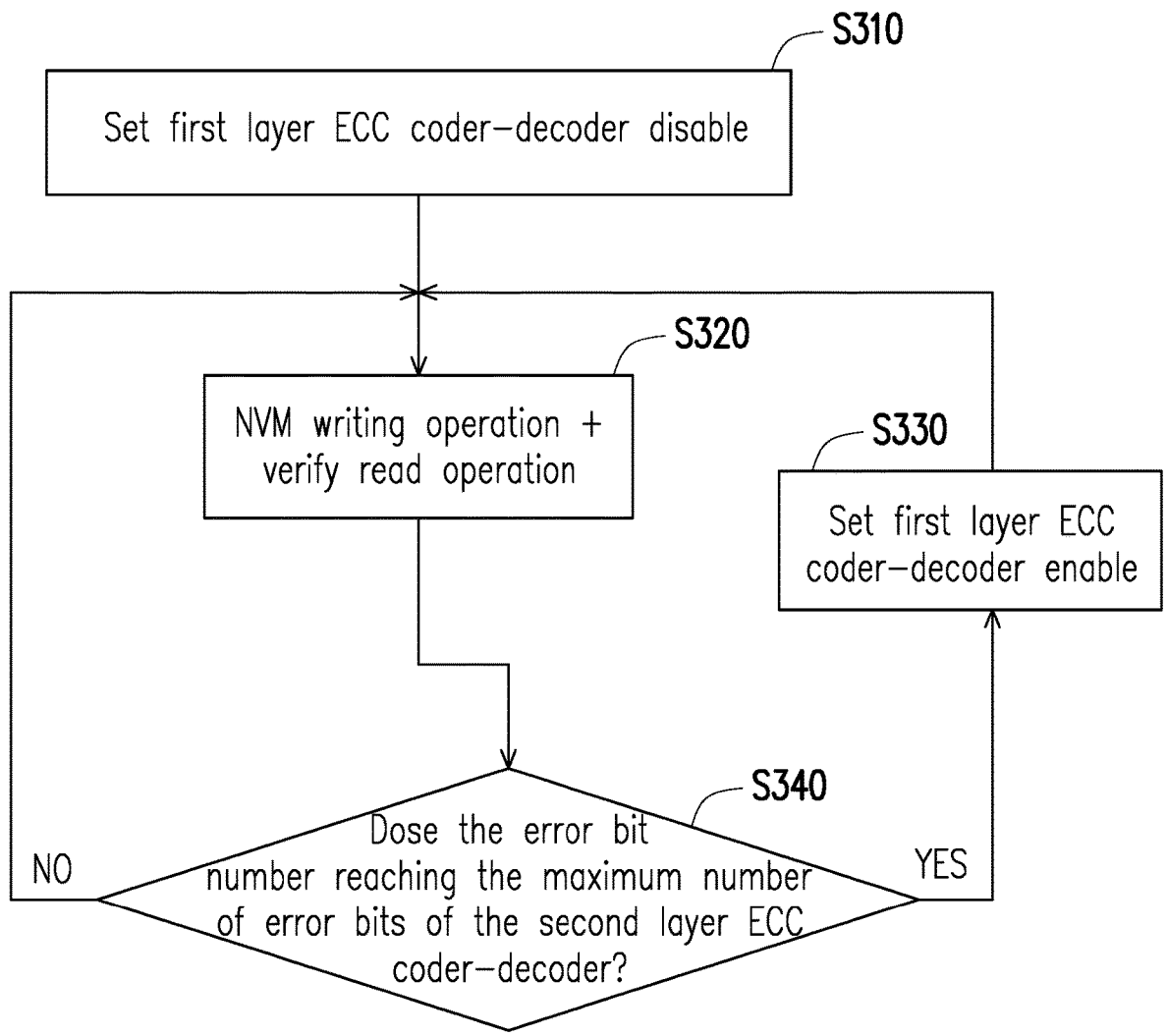
FIG. 3 illustrates a flow chart operated by the hierarchical ECC layer according to an embodiment of present disclosure.

Referring to FIG. 3, which illustrates a flow chart operated by the hierarchical ECC layer according to an embodiment of present disclosure. In step S310, a first layer ECC coder-decoder is set to disable initially. In step S320, a non-volatile memory (NVM) writing operation is performed, and a verify read operation corresponding to the NVM writing operation is performed. In here, write-in data is received and written to the NVM by the NVM writing operation. The verify read operation is used to read the written data form the NNVM to obtain readout data, and verify whether the written data is right or not by comparing the write-in data with the readout data. Further, error bit number can be obtained by the verify read operation, too.

After the step S320, does the error bit number reach the maximum number of error bits of the second layer ECC coder-decoder has been check in step S330. If the error bit number reaches the maximum number of error bits of the second layer ECC coder-decoder, step S330 is operated to set the first layer ECC coder-decoder enable, and the step S320 is re-executed again. On the other hand, if the error bit number does not reach the maximum number of error bits of the second layer ECC coder-decoder, and the step S320 is re-executed again.

It should be noted here, the first layer ECC coder-decoder is enabled (by the step S330) after the NUM writing operation (in the step S320) being operated.

Figure 4:
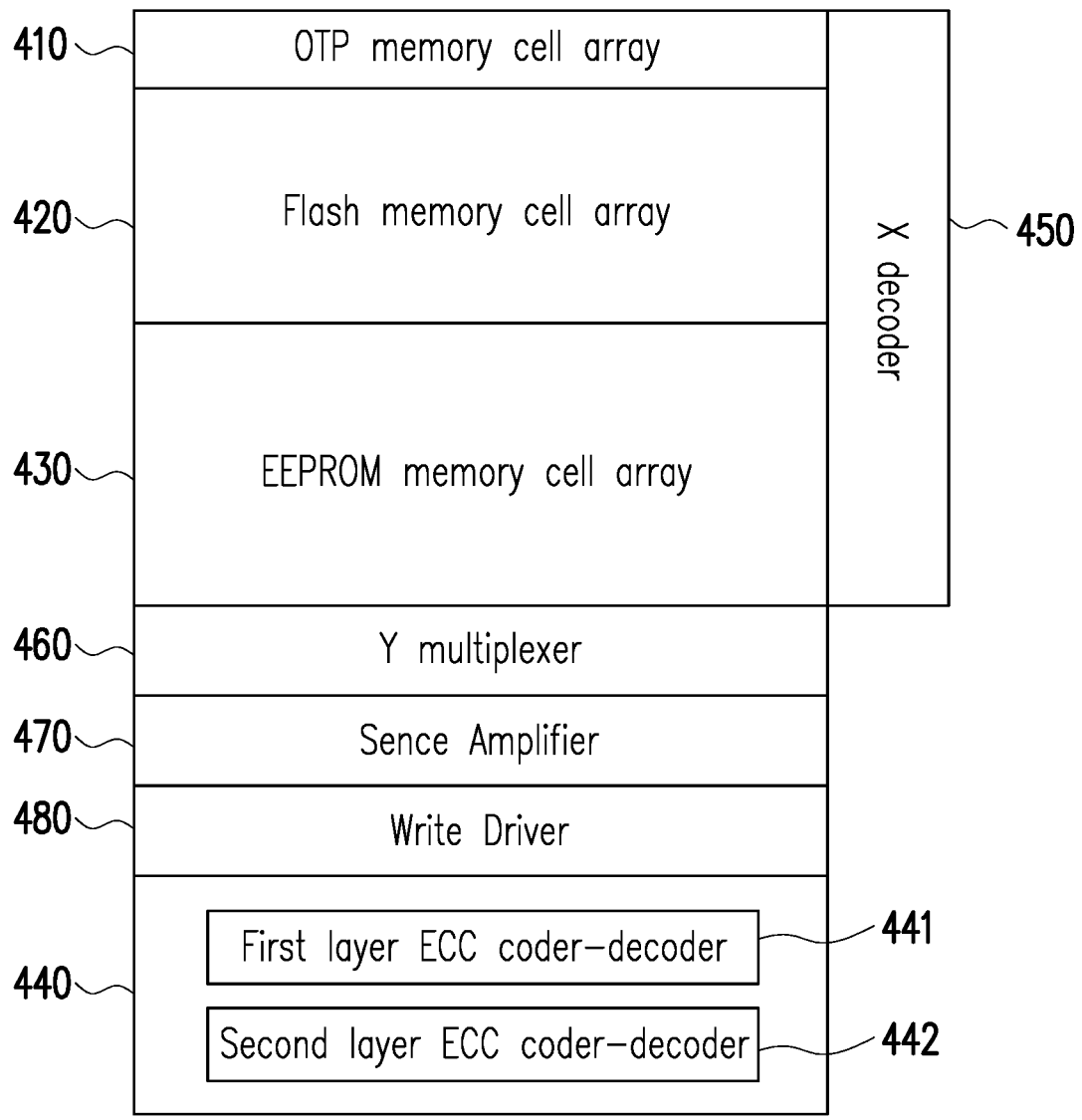
FIG. 4 illustrates a schematic diagram of a memory apparatus according to another embodiment of present disclosure.

Referring to FIG. 4, which illustrates a schematic diagram of a memory apparatus according to another embodiment of present disclosure. The memory apparatus 400 includes an OTP memory cell array 410, a flash memory cell array 420, an EEPROM memory cell array 430, a hierarchical ECC layer 440, a X decoder 450, a Y multiplexer 460, a sense amplifier 470, and a write driver 480. The OTP memory cell array 610, the flash memory cell array 420 and the EEPROM memory cell array 430 respectively have a plurality of different cycling rate, and arranged into an integrated memory cell array. The X decoder 450 is coupled to the OTP memory cell array 410, the flash memory cell array 420 and the EEPROM memory cell array 430, and configured to obtain a first address by decoding an access address signal. The Y multiplexer 460 is also coupled to the OTP memory cell array 610, the flash memory cell array 420 and the EEPROM memory cell array 430, and configured to receive a second address obtained according to the access address signal. That is, accessed memory cells can be addressed according to the first address and the second address in a two-dimension way, and accessed data can be transported through the Y multiplexer 460.

The sense amplifier 470 is coupled to the Y multiplexer 460. The sense amplifier 470 is used to sense the accessed data from the Y multiplexer 460, and the sense amplifier 470 is configured to generate sensed data read from the integrated memory cell. The sense amplifier 470 may include a plurality of sense amplify circuits for respectively generate a plurality of bis of the sensed data. The write driver 480 is coupled to the Y multiplexer and the sense amplifier 470. The write driver 480 may include a plurality of write driving circuits, and the write driving circuits may respectively write a plurality of bits of write-in data to the integrated memory cell.

The hierarchical ECC layer 440 includes a first layer ECC coder-decoder 441 and a second layer ECC coder-decoder 442. In present embodiment, the first layer ECC coder-decoder 441 is not enabled, and the hierarchical ECC layer 440 merely enables the second layer ECC coder-decoder 442 initially, where the error correction strength of the first ECC coder-decoder 441 is stronger than the error correction strength of the second ECC coder-decoder 442. When an error bit number of processed data reaches to a pre-set error correction number of the second ECC coder-decoder 442, the hierarchical ECC layer 440 enables the first ECC coder-decoder 441.

Detail operations have been described in the embodiments mentioned above, no more repeated description here.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A memory apparatus, comprising:
a memory cell array; and
a hierarchical error correction code (ECC) layer, comprising N layers of ECC coder-decoder,
wherein, the hierarchical ECC layer enables one of the N layers to operate an encoding or decoding operation on processed data, and the hierarchical ECC layer enables another one of the N layers merely when an error bit number of the processed data reaches to N−1 pre-set error correction number(s),
wherein N is a positive integer larger than 1.

2. The memory apparatus as claimed in claim 1, the hierarchical ECC layer enables the another one of the N layer of a word merely when the error bit number of the word reaches to N−1 pre-set error correction number(s).

3. The memory apparatus as in claim 1, where N equals to 2 and the another one of the N layers comprises a first ECC coder-decoder, and the one of the N layers comprises a second ECC coder-decoder.

4. The memory apparatus as claimed in claim 3, wherein the N−1 pre-set error correction number(s) is maximum error correction number of the second ECC coder-decoder.

5. The memory apparatus as claimed in claim 4, wherein the hierarchical ECC layer enables both of the first ECC coder-decoder and the second ECC coder-decoder when the processed data is written with a first write condition, the hierarchical ECC layer merely enable the second ECC coder-decoder when the processed data is written with a second write condition, wherein the first write condition is weaker than the second write condition.

6. The memory apparatus as claimed in claim 5, wherein the processed data bits are written by a first write voltage in the first write condition, the processed data is written by a second write voltage in the second write condition, wherein the second write voltage is higher than the first write voltage.

7. The memory apparatus as claimed in claim 3, wherein the processed data comprises a plurality of message bits and a plurality of parity bits, where a first ECC operation is operated on the plurality of parity bits by the first layer ECC coder-decoder, a second ECC operation is operated on the plurality of message bits by the second layer ECC coder-encode.

8. The memory apparatus as claimed in claim 7, wherein the second ECC operation is also operated on the plurality of parity bits.

9. The memory apparatus as claimed in claim 7, wherein the parity bits are written to a first memory cell array, the message bits are written to a second memory cell array.

10. A memory apparatus, comprising:
a plurality of memory cell arrays comprise a first memory cell array and a second memory cell array;
the hierarchical error correction code (ECC) layer as claimed in claim 1, coupled to the memory cell arrays, wherein the second memory cell array shares one of the N-layers.

11. The memory apparatus as claimed in claim 10, the layer ECC coder-decoder of the hierarchical ECC layer is enabled after a data writing operation.

12. The memory apparatus as claimed in claim 10, wherein the plurality of memory cell arrays comprises an one-time-programming (OTP) memory cell array, a flash memory cell array and an electrically-erasable programmable read-only memory (EEPROM) memory cell array.

13. The memory apparatus as claimed in claim 10, further comprising:
a X decoder, coupled to the plurality of memory cell arrays;
a Y multiplexer, coupled to the plurality of memory cell arrays;
a sense amplifier, coupled to the Y multiplexer; and
a write driver, coupled between the sense amplifier and the hierarchical ECC layer.

* * * * *